United States Patent
Babiarz et al.

(10) Patent No.: US 7,341,255 B2
(45) Date of Patent: Mar. 11, 2008

(54) SEALING FITTING WITH EXPANDING MATERIAL

(75) Inventors: Paul S. Babiarz, Liverpool, NY (US); William Bradley Delans, Fayetteville, NY (US)

(73) Assignee: Cooper Industries, Houston, TX (US)

( * ) Notice: Subject to any disclaimer, the term of this patent is extended or adjusted under 35 U.S.C. 154(b) by 718 days.

(21) Appl. No.: 10/391,250

(22) Filed: Mar. 18, 2003

(65) Prior Publication Data

US 2004/0183261 A1  Sep. 23, 2004

(51) Int. Cl.
- F16L 17/00 (2006.01)
- F16L 41/00 (2006.01)
- F16J 15/08 (2006.01)
- H01B 17/26 (2006.01)

(52) U.S. Cl. ........... 277/314; 277/627; 285/216; 174/153 R; 174/157

(58) Field of Classification Search .......... 277/602, 277/605, 626–627, 645–646; 285/96–97, 285/196, 216, 100; 174/157, 153 R, 153 G, 174/65 R, 65 G; 175/76–77

See application file for complete search history.

(56) References Cited

U.S. PATENT DOCUMENTS

| | | | | |
|---|---|---|---|---|
| 3,758,916 A | * | 9/1973 | Wetmore | 174/152 R |
| 4,086,736 A | * | 5/1978 | Landrigan | 52/220.8 |
| 4,454,381 A | * | 6/1984 | Ito et al. | 174/151 |
| 4,607,469 A | * | 8/1986 | Harrison | 52/220.8 |
| 5,137,306 A | * | 8/1992 | Flood | 285/123.2 |
| 5,278,357 A | * | 1/1994 | Yamanashi | 174/151 |
| 5,560,618 A | * | 10/1996 | Wambeke et al. | 277/314 |
| 6,103,341 A | * | 8/2000 | Barz et al. | 428/147 |

* cited by examiner

*Primary Examiner*—Vishal Patel
(74) *Attorney, Agent, or Firm*—Schwegman, Lundberg & Woessner, P.A.

(57) ABSTRACT

An expanding compound is used to seal conduit fittings. The compound is injected into the fitting, and expands to separate conductors within the fitting. In one embodiment, the compound expands to four times its size, and hardens within approximately one hour. In a further embodiment, the compound is a two-part product that is mixed in a self contained applicator and injected into the fitting.

10 Claims, 3 Drawing Sheets

SEALING FITTING WITH EXPANDING MATERIAL

FIELD OF THE INVENTION

The present invention relates to sealing conduits, and in particular to an expanding conduit sealer.

BACKGROUND OF THE INVENTION

Electrical conduit is used to mechanically protect electrical conductors. The U.S. National Electrical Code and Canadian Electrical Code require that explosion-proof enclosures housing arcing and sparking devices be sealed off to prevent propagation of flames or gases through the conduit system, and to minimize the explosion pressures. Such seals minimize the effects of pressure piling by acting as a barrier to stop burning gases from traveling through the conduit to other parts of the system.

When sealing conduit fittings, past methods utilize a fiber material that is weaved around each electrical conductor in the conduit to separate them. The fiber material is also packed in to form a dam at each end of a horizontal fitting, and at the bottom of a vertical fitting. A Portland type cement is then mixed with water and poured in through a funnel, puddled with a stick to remove air bubbles and left to cure for at least 24 hours.

The past methods were fairly labor intensive and error prone. Errors resulted when electrical conductors were not separated or fittings were not filled completely full with sealing compound. Further labor included obtaining clean water and mixing containers and the use of a stick to remove air bubbles.

SUMMARY OF THE INVENTION

An expanding compound is used to seal conduit fittings. The compound is injected into the fitting, and expands to separate conductors within the fitting. In one embodiment, the compound expands to four times its size, and hardens within approximately one hour. In a further embodiment, the compound is a two-part product that is mixed in a self contained applicator and injected into the fitting.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Figure 1:
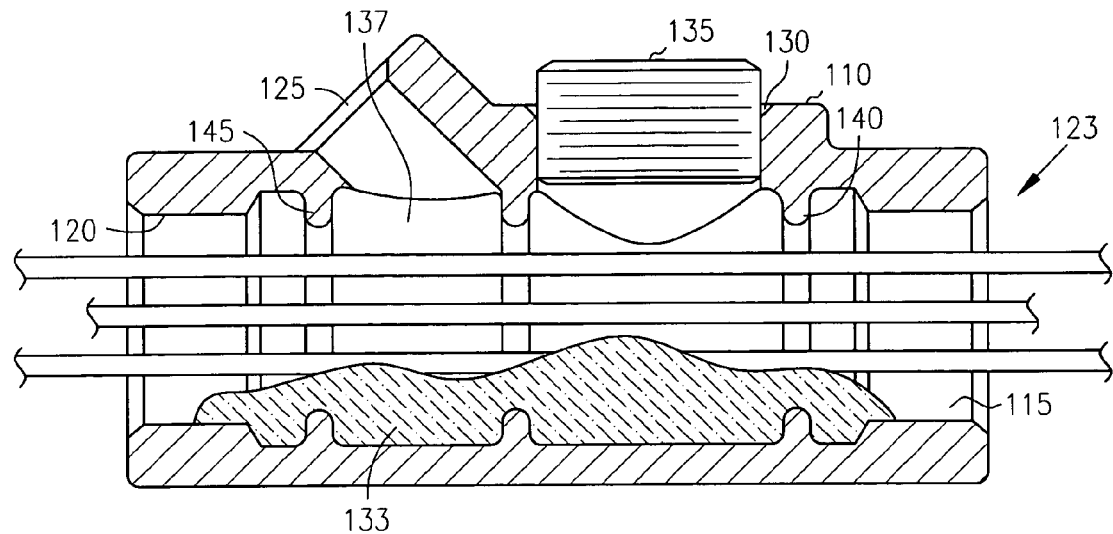
FIG. 1 is a cross section of a horizontal mount sealing fitting illustrating use of a sealing compound.

FIG. 1 shows a horizontal fitting 110 for joining two horizontally disposed conduits via mating sets of threads 115 and 120 at each end of fitting 110. The length of the fitting is approximately the distance between the two sets of thread, and the width of the fitting is approximately equal to the outside diameter of the fitting.

Multiple conductors 123 are disposed within the fitting. Two openings 125 and 130 are provided in the fitting 110. Removable plugs are used to plug the openings. Opening 125 is shown without the plug installed, and a plug 135 is shown installed in opening 130. Opening 130 is larger than opening 125 in one embodiment. An expanding sealing compound 133 is provided in a liquid state inside the fitting 110. One of the plugs may be removed to allow injection of the sealing compound. In this example embodiment, the sealing compound is injected through opening 125.

Figure 2:
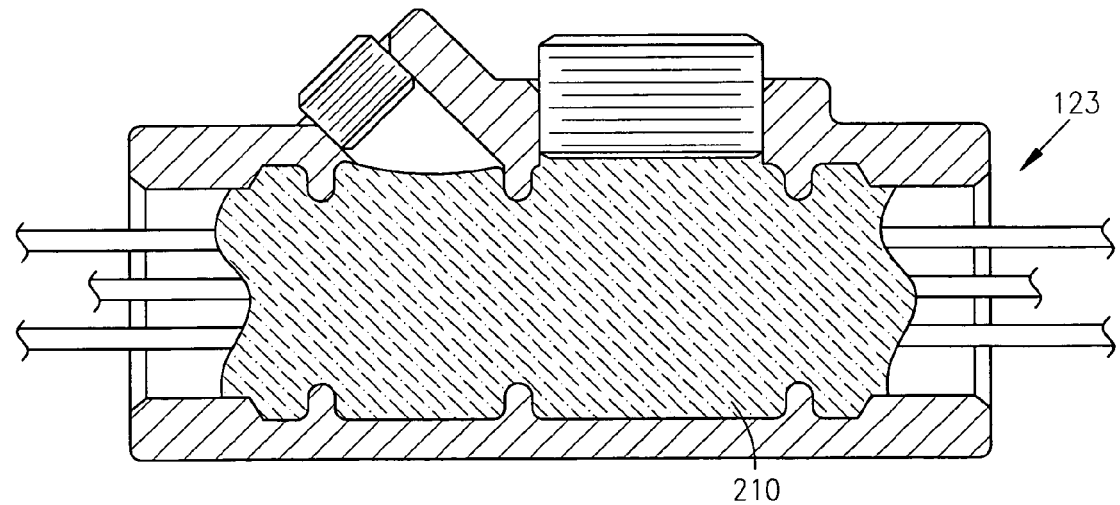
FIG. 2 is a cross section of the sealing fitting of FIG. 1 with expanded sealing compound.

In one embodiment, the sealing compound 133 is a two-part mixture that starts to expand once the two parts are mixed. When expanded, it fills the fitting 110 as shown at 210 in FIG. 2. The expanding compound works its way between conductors so that as it expands, the conductors are separated from each other. In one embodiment, the expanding compound expands four times its size immediately after being mixed. It is desired that when the compound is expanded, none of the conductors are touching either themselves, or sides of the fitting 110, and the compound expands to fill the fitting 110 over at least a portion of the length of the fitting 110 referred to as a sealing chamber 137 which extends between the two ends of the fitting 110. In one embodiment, the sealing chamber 137 extends approximately about and partly past the hub stops 140 and 145 on each end of the fitting. In a further embodiment, the sealing compound forms an explosion proof seal.

In one embodiment, the expanding compound is provided in a cartridge with the two parts or materials separated by a barrier, such as a foil barrier partway between a top and bottom of the cartridge. The cartridge is squeezed to deform the foil barrier, and a mixing rod is coupled to a plunger in the cartridge. The plunger is then pushed to the bottom of the cartridge by the rod. The rod is then pushed and pulled between the top and bottom of the cartridge for approximately 40 to 50 strokes, where a stroke is one complete in and out cycle. The cartridge is rotated while the rod is pushed and pulled to ensure that the plunger is swiping all material in the cartridge.

In one embodiment, mixing is done within 30 seconds of starting the mixing process, as pressure builds up on the inside of the cartridge as the material starts to expand. At the last stroke, the mixing rod is pushed all the way to the bottom of the cartridge. The rod is then pulled out, while the cartridge is squeezed to hold the plunger at the bottom. A nozzle is then attached to the top of the cartridge where the rod was removed, and then the rod is used at the bottom of the cartridge to push the plunger. This causes mixed liquid material, the expanding compound, to be injected through the nozzle. In one embodiment, the cartridge is marked with volumetric increments corresponding to one-ounce segments for measuring the amount of compound injected. The sealing fitting plug is promptly replaced and tightened to prevent the sealing compound from expanding outside the fitting and/or gelling around the threads in the fitting that mate with corresponding threads on the plugs.

The term "compound" in one embodiment comprises the use of two or more materials that are mixed and start expanding. In further embodiments, the compound is a single material that may start expanding at a controlled time, such as by exposure to air or other gases or by electrical stimulation, heat, or any other controllable event.

Typical applications are for sealing fittings in the ½ inch to 6 inch trade sizes. The temperature of the compound should be between 4° C. and 29° C. The compound in one embodiment will expand approximately 4 times its size following injection. The amount of compound for different size fittings may be established empirically, but is approximately one fourth of the volume of the sealing chamber. Some hazardous areas that the seals may be used in include, but are not limited to Class I, Division 1 & 2 Groups A, B, C, D and Class I, Zones 0, 1 & 2.

In one embodiment, the compound used is Chem-Cast 637 sealing foam c/o Chem-Cast 637 isocyanate and Chem Cast 637 Polyol. Isocyanate is a dark brown liquid, insoluble in water with a boiling point of 392 degrees F. (200 degrees C.), a vapor density of 0.00016 (mm Hg) and a specific gravity of 1.2 g/ml. Polyol is a gray liquid, partially soluble in water with a specific gravity of 1.05 g/ml. When mixed together the resultant material is gray in color. It has a rise time of 1.5-2.5 minutes and a gel time of 4-5 minutes. When fully cured the foam density is 15-20 lbs./ft$^3$ The compression strength is >60 psi, porosity is >90% closed cell and has a water absorption of <1%. Chem-cast 637 is a fire resistant two-part rigid, polyurethane foam. It expands to fill voids inside of the sealing fitting and forms a dense, high strength foam. It has excellent adhesion to many surfaces without the use of primers.

Figure 3:
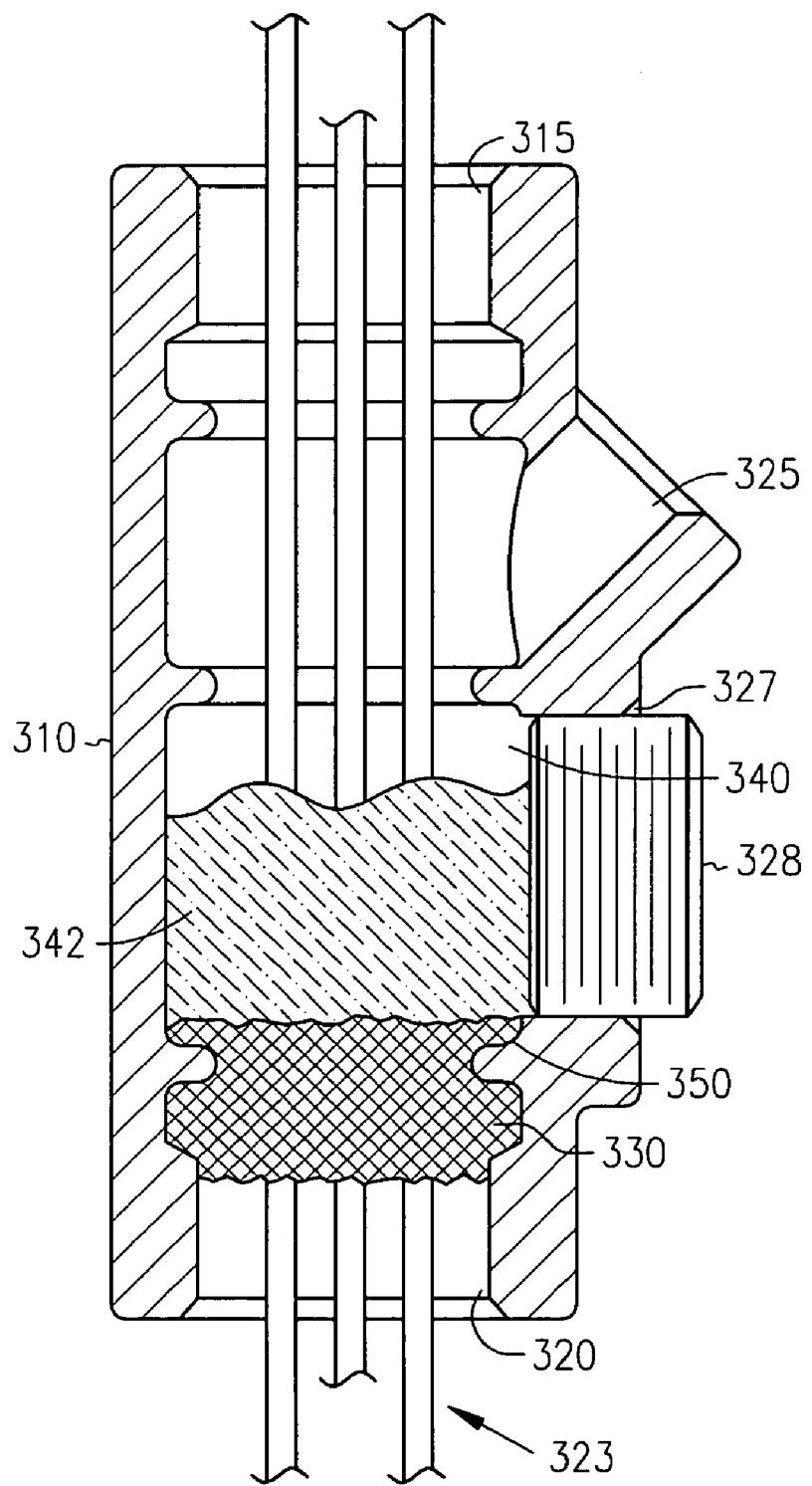
FIG. 3 is a cross section of a vertical mount sealing fitting illustrating use of a sealing compound

FIG. 3 shows a vertical fitting 310 for connecting two vertically disposed conduits via threads 315 and 320. Multiple conductors 323 are disposed within the fitting. One or more openings 325 and 327 provide access to the inside of the fitting. Threaded plugs are used to plug the openings. One plug 328 is shown installed in opening 327, which is a lower opening. In one embodiment, opening 325 is a top opening that provides access to the inside of the fitting 315 to inject the liquid compound. Opening 327 provides access to create a fiber dam 330 at a bottom of the fitting, referred to as a hub. In one embodiment, the fiber is a mineral fiber, such as Chico X® sealing compound provided by Crouse-Hinds and it is packed using a hardwood stick of other tool that will not damage the conductors. Hub sizes range from ½ inch to 6 inches.

The fiber is first packed while the conductors are forced away from the hub opening and forced apart. The fiber is then packed between and around conductors in the hub to form the dam 330. An area above the dam 330 is referred to as a sealing chamber 340. The dam provides a means of blocking the un-gelled expanding compound 342 from leaking out of the sealing chamber. Care should be taken to ensure no shreds of fiber are left clinging to the side wall of the sealing chamber or to the conductors. Such shreds when imbedded in the sealing compound may form leakage channels. The completed dam should be even with an internal bushing 350, also referred to as a conduit stop. For the horizontal fitting, no dams are required, but may be used if desired.

Figure 4:
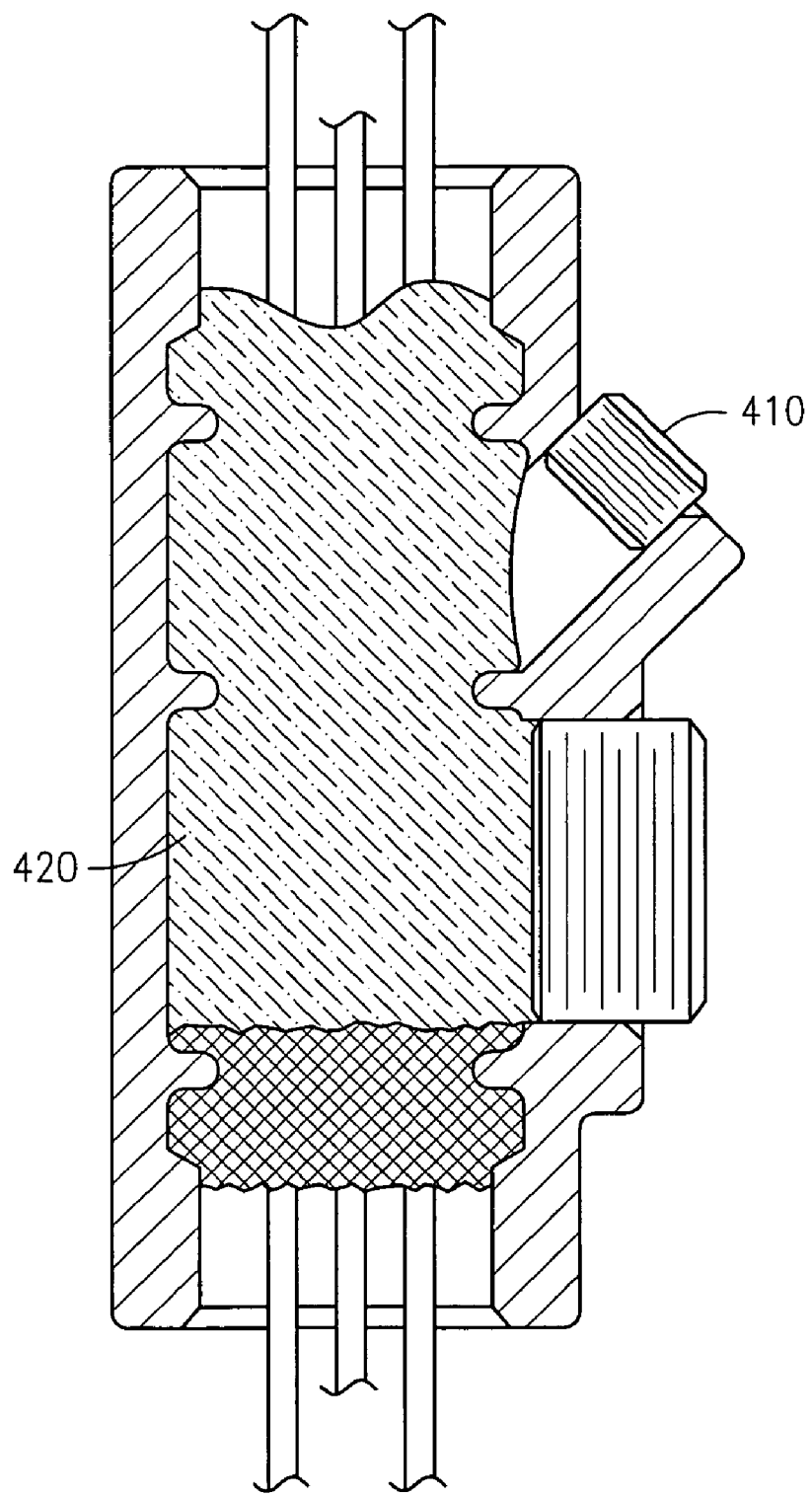
FIG. 4 is a cross section of the sealing fitting of FIG. 2 with expanded sealing compound.

FIG. 4 shows vertical fitting 310 with a plug 410 installed quickly after the compound is inserted, and it shows the compound in a fully expanded state at 420. The compound works its way between conductors as it expands to ensure that none are touching each other when the compound is fully expanded. An explosion proof seal is formed. The term "explosion proof" refers to normally encountered explosive environments. It is not meant to cover environments not normally anticipated in environments where such fittings are utilized.

The invention claimed is:

1. A method of filling a sealing fitting having conductors running through it, the method comprising:
    mixing an expanding sealing compound;
    adding the sealing compound to the sealing fitting, wherein the compound is added through an opening;
    allowing the sealing compound to expand in the sealing fitting such that the conductors are separated; and
    plugging the opening following addition of the compound.

2. The method of claim 1 wherein the compound expands approximately four times in size after mixing.

3. The method of claim 1 wherein the compound is added prior to significant expansion of the compound.

4. The method of claim 1 wherein the fitting is between one-half inch and six inches.

5. The method of claim 1 wherein the sealing compound expands to fill a sealing chamber of the fitting.

6. The method of claim 5 wherein the sealing compound provides an explosion proof seal.

7. The method of claim 1 wherein the sealing compound is mixed at a temperature approximately between 4° C. and 29° C.

8. The method of claim 1 wherein the sealing fitting comprises a horizontally oriented sealing fitting.

9. A method of filling a sealing fining having electrical conductors running through it, the method comprising:
    mixing an expanding sealing compound;
    adding the sealing compound to the sealing fitting through an opening having a mating removable plug;
    inserting the removable plug in the opening; and
    allowing the sealing compound to expand in the sealing fitting and work its way between conductors to cause the electrical conductors to be separated.

10. The method of claim 1 wherein the conductors are electrical conductors, and wherein the sealing compound directly contacts the conductors and separates them from each other as the sealing compound expands.

* * * * *

UNITED STATES PATENT AND TRADEMARK OFFICE
CERTIFICATE OF CORRECTION

| | | |
|---|---|---|
| PATENT NO. | : 7,341,255 B2 | Page 1 of 1 |
| APPLICATION NO. | : 10/391250 | |
| DATED | : March 11, 2008 | |
| INVENTOR(S) | : Babiarz et al. | |

It is certified that error appears in the above-identified patent and that said Letters Patent is hereby corrected as shown below:

In column 4, line 41, in Claim 9, delete "fining" and insert -- fitting --, therefor.

Signed and Sealed this

First Day of July, 2008

JON W. DUDAS
*Director of the United States Patent and Trademark Office*